(12) United States Patent
He

(10) Patent No.: US 8,028,919 B2
(45) Date of Patent: Oct. 4, 2011

(54) IMAGING BAR CODE READER WITH SINGLE PRISM FOCUS ADJUSTMENT

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1026 days.

(21) Appl. No.: 11/871,194

(22) Filed: Oct. 12, 2007

(65) Prior Publication Data

US 2009/0095815 A1    Apr. 16, 2009

(51) Int. Cl.
*G06K 7/10* (2006.01)
(52) U.S. Cl. .................................. 235/462.41
(58) Field of Classification Search .......... 235/454, 235/462.43–462.45, 439
See application file for complete search history.

(56) References Cited

U.S. PATENT DOCUMENTS

| 6,766,955 | B2 | 7/2004 | Patel et al. |
| 6,905,068 | B2 | 6/2005 | He |
| 2006/0038017 | A1 | 2/2006 | Carlson et al. |

*Primary Examiner* — Seung Lee
(74) *Attorney, Agent, or Firm* — NongQiang Fan

(57) ABSTRACT

The disclosed bar code reader includes an auto-focusing component for rapidly producing in focus images. An imaging system makes use of an aiming pattern that impinges upon the coded indicia of a target. The imaging system includes a light monitoring pixel array and a focusing lens that is fixed with respect to the pixel array for transmitting an image of the target object onto the pixel array. The imaging system also includes a moveable prism mounted for movement along a path of travel to transmit light passing through the focusing lens onto the pixel array. A drive motor moves the prism relative the lens to adjust a focus of an image of the object formed at the pixel array.

21 Claims, 2 Drawing Sheets

IMAGING BAR CODE READER WITH SINGLE PRISM FOCUS ADJUSTMENT

FIELD OF THE INVENTION

The present invention relates to a focusing system for an imaging-based bar code reader.

BACKGROUND OF THE INVENTION

Various electro-optical systems have been developed for reading optical indicia, such as bar codes. A bar code is a coded pattern of graphical indicia comprised of a matrix or series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and attempts to decode the imaged bar code.

The ability of an imaging system to successfully decode an imaged bar code is dependent upon the ability to satisfactorily capture a clear image of the target bar code that is focused onto the pixel array. Generally imaging scanners do not have movable lenses. They depend on using a small aperture such that mildly out-of-focus objects (barcodes) do not appear excessively blurred. A class of scanners or bar code readers sold by the assignee of the present invention use a bi-focal system, in which the lens is driven by an electro-magnetic motor, to one of two stable positions. U.S. Pat. No. 6,766,955 describes such a bi-focal system and is incorporated herein by reference.

While auto-focus in a bar code reader is a desirable feature, commercially available auto-focus sub-systems, such as those commonly used in digital cameras and camcorders, suffer from large size, slow action, and/or high power requirement.

Whether the imaging system is housed in a handheld, portable bar code reader or a permanently mounted reader, the user of the device cannot be expected to manually focus the imaging system by moving the lens, thus, there is a need for an automatic focusing system or auto focus system for an imaging system.

Bar code imaging systems require a variable focus optical system to maximize barcode reading range and deliver high quality images over a range of distances. The high scan rate for barcode reading imposes a high-speed requirement on the auto focusing technique to be used in the imaging system.

A typical two-dimensional barcode imaging scanner has an aiming pattern generator for the user to aim the scanner at the target and a separate illuminating system for illuminating the entire two-dimensional field of view. One auto-focusing technique that uses this aiming pattern is described in U.S. published patent application 2006:0038017 published on Feb. 23, 2006, which is assigned to the assignee of the present invention, and incorporated herein by reference in its entirety.

This above published application improves imaging quality through use of an auto-focus mechanism. Use of a moving lens tends to increase the device size. It is therefore desirable to create a compact auto-focus mechanism that does not appreciably increase device dimensions in relation to existing fixed focus imaging devices.

U.S. Pat. No. 6,905,068 is also assigned to the assignee of the present invention and is incorporated herein by reference. The '058 patent describes focusing an electro-optical reader for reading indicia by moving one prism relative to another prism. An outgoing laser beam directed to indicia has a return image focused by the moving prism.

SUMMARY

An exemplary system is used with an imaging based barcode reader for imaging a target and has an imaging system that includes a light monitoring pixel array and an optical system having one or more focusing lenses fixed with respect to the pixel array to transmit an image of a target object toward said pixel array from a focusing lens which includes a curved exit surface facing the pixel array.

A single prism moves along a path of travel to control a path length of light passing through the lens to the pixel array. A drive coupled to the prism moves the prism relative the lens to adjust a focus of an image of the target object formed at the pixel array.

These and other objects advantages and features of the invention will become further understood from reference to the accompanying description of an exemplary embodiment of the invention when considered in conjunction with the accompanying drawings.

DETAILED DESCRIPTION

Figure 1:
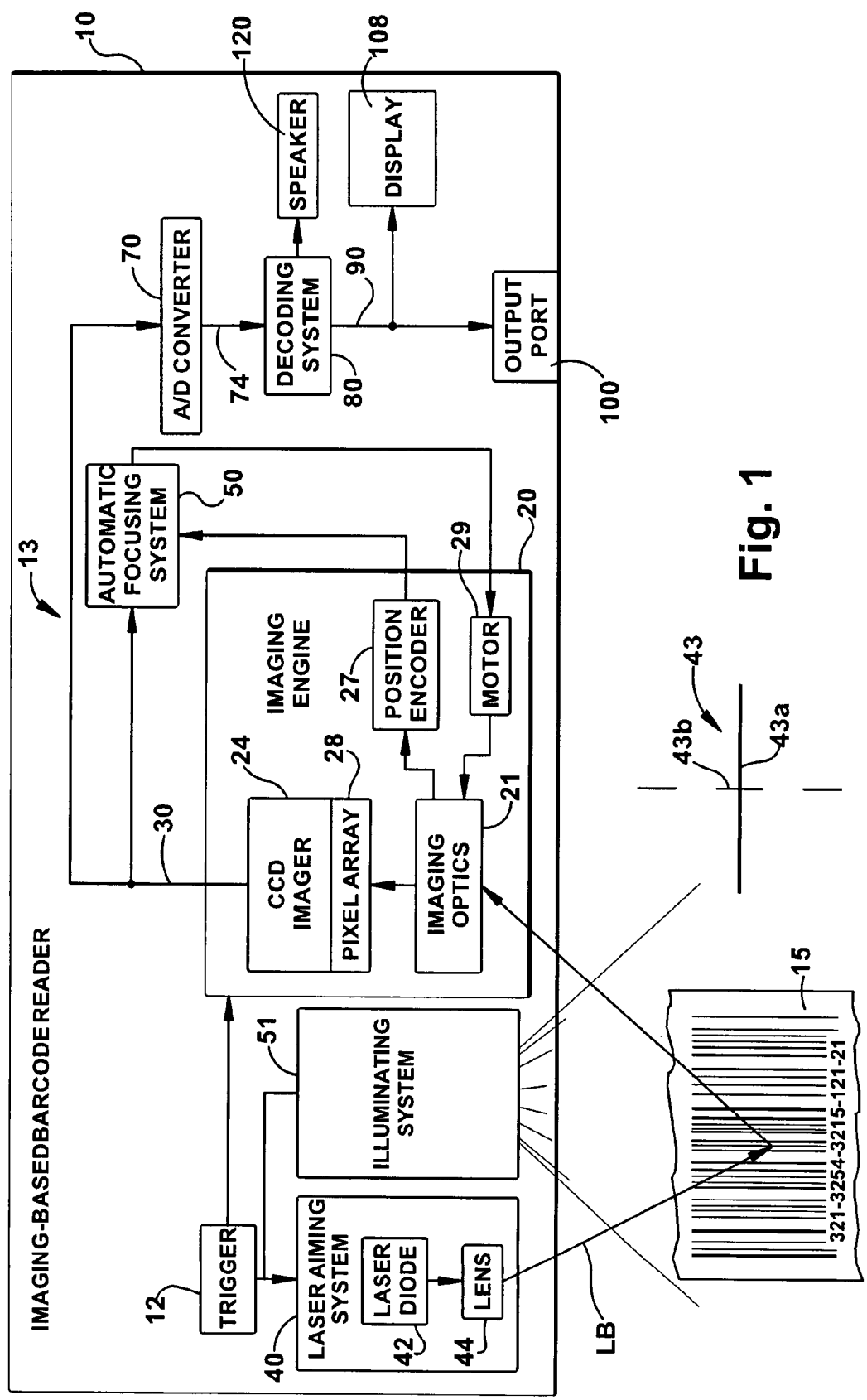
FIG. 1 is a schematic block diagram of an imaging-based bar code reader of the present invention having an automatic focusing system.

A block diagram of an imaging-based bar code reader 10 is shown schematically in FIG. 1. The bar code reader 10, in addition to imaging and decoding both 1D and 2D bar codes and postal codes, is also capable of capturing images and signatures. In one preferred embodiment of the present invention, the bar code reader 10 is a hand held portable reader components of which are supported within a housing 11 (FIG. 5) that can be carried and used by a user walking or riding through a store, warehouse or plant for reading bar codes for stocking and inventory control purposes.

An auto-focus reader of the present invention, however, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

The bar code reader 10 includes a trigger 12 coupled to bar code reader circuitry 13 for initiating reading of a target bar code 15 positioned on an object when the trigger 12 is pulled or pressed. The bar code reader 10 includes an imaging component 20 including imaging optics 21 and a CCD imager 24.

A fixed lens (described in greater detail below) focuses light reflected from the target bar code 15 onto an array of photosensors or pixels 28 of the CCD imager 24. The pixels of pixel array 28 are read out generating an analog signal at an output 30 representative of an image of whatever is focused by the lens on the pixel array 28, for example, an image of the bar code 15. The analog image signal at the output 30 is then digitized by an analog-to-digital converter 70 and a digitized signal at an output 74 is decoded by decoder circuitry 80. Decoded data 90, representative of the data/information coded in the bar code 15 is then output via a data output port 100 and/or displayed to a user of the reader 10 via a display 108. Upon achieving a good "read" of the bar code 15, that is, the bar code 15 was successfully imaged and decoded, a speaker 120 is activated by the circuitry 13 to indicate to the user that the bar code has been successfully read.

The reader 10 further includes an aiming pattern generator 40 that generates a visible aiming pattern 43 to aid the user in properly aiming the reader at the target bar code 15. In one preferred embodiment, the aiming generator 40 is a laser aiming apparatus. Alternatively, the aiming apparatus 40 may utilize an LED or another source of illumination known to those of skill in the art. The pattern 43 may be a pattern comprising a crosshair formed from a thick horizontal line 43a and a perpendicular thin vertical line 43b. In one preferred embodiment, the laser aiming apparatus 40 includes a laser diode 42 and a diffractive lens 44. In one embodiment, in addition to the aiming pattern generator 40, the reader 10 includes a separate illumination system 51 for shining illumination light onto the target bar code 15.

The CCD or CMOS sensors that make up the imager 24 sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. One such sensor is a CMOS array made by Micron having part number MT9M001. The pixel data from the array is converted into digital data by an A/D converter 70 that is decoded by decoding system 80. An output port or display 108 provides the results of decoding to a peripheral device (not shown) or displays them to the user. The scanner 10 also includes an illumination source (not shown) that is capable, within a prescribed scanner range, of illuminating a portion of the target surface sufficient to fill the entire two-dimensional array of sensors with data. The scanner includes an aiming pattern generator 40 that includes one or more laser diodes 42 and a focusing lens 44 (see FIG. 1) that is activated by a user actuated trigger 12.

Imaging Optics

Figure 3A:
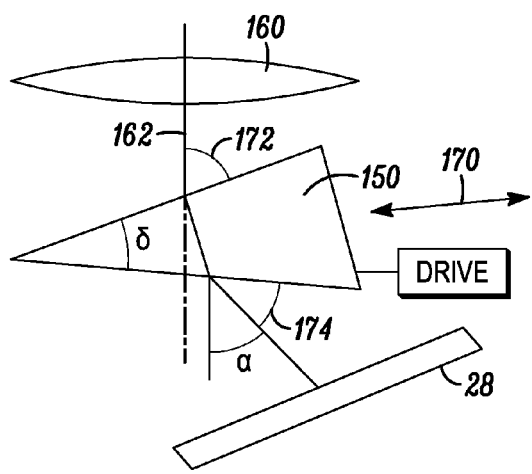
FIGS. 3A and 3B are schematic illustrations of focus adjustment of the bar code reader caused by moving a single prism located in the optical path from a focusing lens and a pixel imaging array.

As shown in FIG. 3, In the exemplary embodiment, a single prism 150 is inserted between an optical system represented by a lens 160 and the imaging array 28. A focus adjustment mechanism provides a linear shift of the prism as shown by the double headed arrow 170 in FIG. 3A. In the Exemplary embodiment the prism is approximately triangular in plan and is moved back and forth along a path such that an angle at which light enters and exits its entrance and exit surfaces are equal angles 172, 174. This is referred to as the angle of least deviation. Under this condition the angular change caused by the prism to an axial ray 162 is given by the equation:

$$\alpha = 2\sin^{-1}\left(\frac{n}{n_0}\sin\frac{\delta}{2}\right) - \delta$$

In this equation, δ is the prism angle (the 'top corner' angle, which is the corner shown to the left in FIG. 3A), n is the index of refraction of the prism material, and $n_0$ is the index of refraction of air.

Figure 3B:
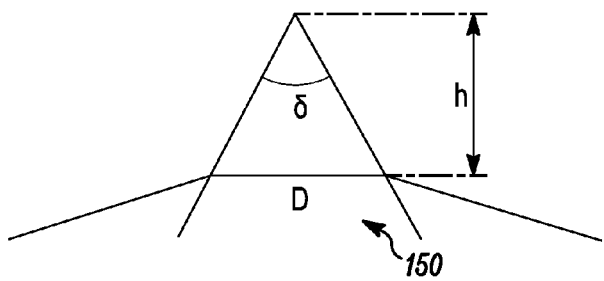

The light path inside of the prism D is proportional to the amount of prism inserted into the light path, h. This relationship is:

$$D = 2h\tan\frac{\delta}{2}$$

and is illustrated in FIG. 3B. When D changes, by the change of h due to controlled movement of the prism 150, the optical path length changes. The larger the value for D, the greater the focal length at which the scanner or reader is focused.

When the amount by which the prism is inserted into the optical path changes, the optical path difference (OPD) caused by it is given by:

$$OPD = (n - n_0)\Delta D$$

and the axial ray is shifted, relative to a stationary sensor location by:

$$\Delta \tau = D\cos\frac{\alpha}{2}$$

The combination of the last two equations results in a parallax. That is, with the focus adjustment comes a lateral shift of the center of the optical axis, as seen from the sensor. This fact could be used advantageously in an imaging scanner having a single, off-axis, aiming pattern generator. Prior art scanners include a laser aimer that is off-axis, creating parallax. Because there are two parameters that can be adjusted, namely n and δ it is possible within some range to choose the amount of parallax that is generated by this focus changing mechanism.

Laser Ranging

One autofocus process involves a determination of the distance from the scanner to the object or target to which the bar code is affixed. The laser light emitted by the laser diode 42 that generates the laser aiming pattern 43 travels outwardly toward the target bar code 15. The laser beam impacts the bar code 15 or the object the bar code is affixed to and is reflected back toward the reader where it is focused on the pixel array 28 by the lens 160. Laser ranging utilizes the laser aiming apparatus 40 to determine an object distance u (shown in FIG. 2) between a principal plane PP of the lens 160 and the object plane OP, that is, a surface of the target bar code 15, along the optical axis OA. The object distance u is computed using a parallax distance algorithm.

Using geometric relationships, a parallax distance algorithm determines the object distance u. Given that the object distance u has been determined and further given that the focal length f of the lens is known, the image distance v can be computed using the standard lens equation (Thin Lens law) 1/f=1/u+1/v. The image distance v is the distance between the principal plane PP of the lens 22 and a light receiving surface of the pixel array 28.

The automatic focusing component 50 moves the prism 150 along its path of travel in the direction of the arrow 170 to a suitable position such that a satisfactory image distance (including D, the path through the prism) of the laser aiming pattern 43 is focused onto the pixel array 28.

The goal of the auto focusing system 50 is to bring the image into focus prior to image capture of the entire bar code. A depth of field of the imaging system 20 permits a tolerance or imprecision in the range measurement. Laser ranging can also be used with a calibration process wherein the distance to the object is determined and a separation between this distance and a pre-measured or calibrated set of standard distances and prism locations is determined. By finding the closest calibrated object distance the prism is moved to the position corresponding to that distance and acceptable focus obtained.

The essence of laser ranging is locating the center of the aiming pattern 43 which is located at the intersection of the thick horizontal line 43a and the thin vertical line 43b and monitor its movement as the mirror moves. Considering the image of the laser beam is highly blurred when the mirror position produces an out of focus image, it is necessary for the automatic focusing system 50 to identify a region of interest (ROI) of the laser spot, i.e., the region where the aiming pattern 43 lies and its blurred peripheral, and compute the center of mass (COM): X=i .times. i*I .function. (i) i .times. I .function. (i), (22) where i indicates the x coordinate of the pixels within the ROI and I(i) their corresponding intensity. The same applies to the Y coordinate.

A detailed theoretical analysis of the COM computation is presented in an article entitled "Novel Denoising Algorithm for Obtaining a Superresolved Position Estimation" by Z. Zalevsky, et al., Opt. Eng., 41(6), pp. 1350-1357, June 2002. The foregoing article is incorporated in its entirety by reference herein. The process used by the automatic focusing system 50 for locating the center of the aiming pattern is illustrated in the above two published patent applications.

Passive Focusing

So called passive focusing is a technique wherein the object distance is not used to obtain acceptable optical system focus. During passive focusing different images of an aiming pattern 43 are obtained with different prism positions. The auto focusing system 50 determines a best focus by calculating the contrast of the image. Blurriness reduces contrast so that the best (in focus) image corresponds to the image having the greatest contrast. One patent that discusses the differences between active and passive focusing in the context of a camera is U.S. Pat. No. 6,979,808 which is assigned to Canon.

While the present invention has been described with a degree of particularity, it is the intent that the invention includes all modifications and alterations from the disclosed design falling with the spirit or scope of the appended claims.

The invention claimed is:

1. An imaging based barcode reader for imaging a target comprising:
    an imaging system that includes a light monitoring pixel array,
    an optical system having one or more focusing lenses fixed with respect to the pixel array to transmit an image of a target object toward said pixel array from a focusing lens which includes a curved exit surface facing said pixel array;
    a single prism mounted for movement along a prism path of travel that intercepts light passing through the lens to the pixel array; and
    a drive operative to the single prism along the prism path of travel to a suitable position for properly focusing of an image of the target object onto the pixel array.

2. The bar code reader of claim 1 additionally comprising an automatic focusing component coupled to the drive for analyzing an image reflected from the target object and projected onto the pixel array by the optical system.

3. The bar code reader of claim 2 where the automatic focusing component moves the single prism to move along its path of travel to the suitable position for properly focusing the image onto the pixel array.

4. The reader of claim 2 wherein the drive comprises a motor drive coupled to the prism and wherein the automatic focusing component comprises a position encoder for determining a position of the prism with respect to the lens as the motor drive moves the mirror within a region between said lens and the pixel array.

5. The bar code reader of claim 2 wherein the automatic focusing component comprises a range finding component for determining how much to move the prism based on the range to the target object.

6. The bar code reader of claim 2 wherein the automatic focusing component comprises a component for evaluating a contrast of the image reflecting from the target object at different positions of the prism to obtain a best focus.

7. The bar code reader of claim 2 additionally comprising an aiming pattern generator and wherein the image is an image of an aiming pattern directed to the target object by the pattern generator.

8. The reader of claim 1 wherein the single prism moves along a generally linear travel path.

9. The bar code reader of claim 1 wherein the single prism approximates a triangle in plan that is symmetric about a center line generally parallel to the path of travel along which the prism moves to adjust a focus of said reader.

10. A method of focusing an image of a target object of a bar code reader including an imaging pixel array comprising:
    orienting a focusing lens to transmit light from the target object;
    bending light from a target that passes through the focusing lens onto the imaging pixel array by positioning a single prism to intercept light exiting a curved exit surface of the focusing lens and redirecting said light to the imaging pixel array; and
    adjusting a focus of the reader for imaging of the target object by moving the single prism along a prism path of travel to a suitable position for properly focusing an image of the target on the imaging pixel array.

11. The method of claim 10 additionally comprising analyzing an image reflected from the target object and projected onto the pixel array by the optical system before adjusting the focus by moving the single prism.

12. The method of claim 11 where an automatic focusing component is coupled to a drive for causing the single prism to move along its path of travel to the suitable position for properly focusing the image onto the pixel array.

13. The method of claim 10 comprising moving the single prism along a generally linear travel path.

14. The method of claim 10 wherein an automatic focusing component determines a position of the prism with respect to the lens as a motor drive moves the prism.

15. The method of claim 10 wherein the automatic focusing component comprises a range finding component for determining how much to move the prism based on the range to the target object.

16. The method of claim 10 wherein an automatic focusing component evaluates a contrast of an image reflected from the target object at different positions of the prism to obtain a best focus position of said prism.

17. The method of claim 10 additionally comprising directing an aiming pattern onto the target object and wherein the automatic focusing component evaluates a reflected image of the aiming pattern before positioning the prism.

18. An imaging based barcode reader for imaging a target object comprising:
- imaging means for forming an image on a light monitoring pixel array,
- focusing means fixed with respect to the pixel array for focusing an image of a target object to the pixel array;
- focus-adjusting means comprising a single prism mounted for movement along a prism path of travel for changing the light path subsequent to the focusing means onto the pixel array;
- drive means operative to move the single prism along the prism path of travel to a suitable position for properly focusing an image of the target object onto the pixel array; and
- automatic focusing means for analyzing the reflected image from the target object and projected onto the pixel array and moving the single prism along the prism path of travel to the suitable position for properly focusing the image of the target object onto the pixel array.

19. The imaging based barcode reader of claim 18 additionally comprising means for generating an aiming pattern to impinge upon and illuminate a portion of a target for use in adjusting a focus.

20. The reader of claim 18 wherein the automatic focusing means comprises a ranging sensor means for determining a distance between the focusing lens and the target object to determine a position of said single prism.

21. The reader of claim 18 wherein the prism widens from a relatively narrow apex to a thicker base portion and wherein the drive means moves the prism to adjust a path length of light passing from the focusing means to the pixel array.

* * * * *

UNITED STATES PATENT AND TRADEMARK OFFICE
CERTIFICATE OF CORRECTION

| | | |
|---|---|---|
| PATENT NO. | : 8,028,919 B2 | Page 1 of 1 |
| APPLICATION NO. | : 11/871194 | |
| DATED | : October 4, 2011 | |
| INVENTOR(S) | : He | |

Figure 2:
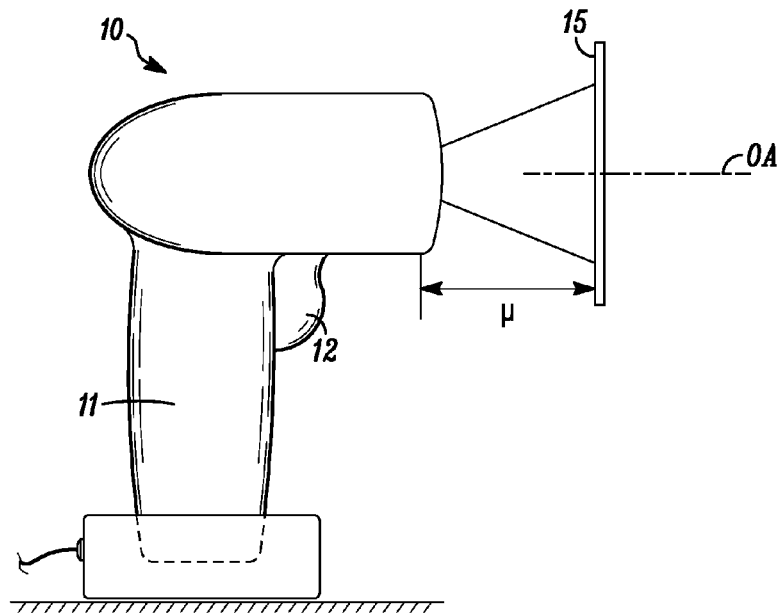
FIG. 2 is a depiction of a housing for supporting the components depicted in FIG. 1.

It is certified that error appears in the above-identified patent and that said Letters Patent is hereby corrected as shown below:

In Fig. 2, Sheet 2 of 2, delete "μ" and insert -- u --, therefor.

In Column 3, Line 51, delete "In" and insert -- in --, therefor.

In Column 6, Line 1, in Claim 3, delete "where" and insert -- wherein --, therefor.

In Column 6, Line 5, in Claim 4, delete "The" and insert -- The bar code --, therefor.

In Column 6, Line 24, in Claim 8, delete "The" and insert -- The bar code --, therefor.

In Column 6, Line 47, in Claim 12, delete "where" and insert -- wherein --, therefor.

In Column 8, Line 8, in Claim 20, delete "The" and insert -- The imaging based barcode --, therefor.

In Column 8, Line 12, in Claim 21, delete "The" and insert -- The imaging based barcode --, therefor.

Signed and Sealed this
Eighteenth Day of December, 2012

David J. Kappos
*Director of the United States Patent and Trademark Office*